(12) United States Patent
Moon et al.

(10) Patent No.: US 10,893,184 B2
(45) Date of Patent: Jan. 12, 2021

(54) ELECTRONIC DEVICE AND METHOD FOR PROCESSING IMAGE

(71) Applicant: Samsung Electronics Co., Ltd., Gyeonggi-do (KR)

(72) Inventors: Sung-Hwan Moon, Gyeonggi-do (KR); Jeong-Hwan Min, Gyeonggi-do (KR); Dae-Yun Park, Gyeonggi-do (KR); Min-Jung Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 42 days.

(21) Appl. No.: 16/089,892

(22) PCT Filed: Feb. 28, 2017

(86) PCT No.: PCT/KR2017/002210
§ 371 (c)(1),
(2) Date: Sep. 28, 2018

(87) PCT Pub. No.: WO2017/171248
PCT Pub. Date: Oct. 5, 2017

(65) Prior Publication Data
US 2019/0122339 A1    Apr. 25, 2019

(30) Foreign Application Priority Data
Mar. 30, 2016    (KR) .................. 10-2016-0038585

(51) Int. Cl.
*H04N 5/232*    (2006.01)
*H04N 5/235*    (2006.01)
(Continued)

(52) U.S. Cl.
CPC .......... *H04N 5/232* (2013.01); *G06T 3/4053* (2013.01); *H04N 5/235* (2013.01); *H04N 5/2355* (2013.01);
(Continued)

(58) Field of Classification Search
CPC ............... H04N 5/232; H04N 5/23232; H04N 5/23277; H04N 5/23293; H04N 5/235;
(Continued)

(56) References Cited

U.S. PATENT DOCUMENTS 9,465,129 B1 * 10/2016 Olsson .................... G06F 19/00
                                                                348/61
10,116,879 B2 * 10/2018 Huysegems ....... H04N 5/23216
                                                                348/208.99
(Continued)

FOREIGN PATENT DOCUMENTS

KR    1020100139030    12/2010
KR    1020150026268    3/2015
(Continued)

OTHER PUBLICATIONS

PCT/ISA/210 Search Report issued on PCT/KR2017/002210 (pp. 5).
(Continued)

*Primary Examiner* — Marly S Camargo
(74) *Attorney, Agent, or Firm* — The Farrell Law Firm, P.C.

(57) ABSTRACT

The present invention provides an electronic device and a method for processing an image. A method of the electronic device according to various embodiments can comprise the operations of: obtaining, using an image sensor, a plurality of images including a first image and a second image corresponding to external objects, providing, using the image sensor, at least a part of processed images of the plurality of images as a preview image; detecting image information based on at least the preview image; storing, in a buffer, images including at least the first and second images of the plurality of images; and synthesising, in response to an image capture related input, an image set including at least the first and second images of the images (Continued)

stored in the buffer using the image information so as to create a third image. In addition, the present invention may include other embodiments.

13 Claims, 9 Drawing Sheets

(51) Int. Cl.
H04N 5/265 (2006.01)
H04N 5/262 (2006.01)
G06T 3/40 (2006.01)
G06T 7/579 (2017.01)
G06K 9/36 (2006.01)
G06K 9/46 (2006.01)

(52) U.S. Cl.
CPC ..... *H04N 5/23232* (2013.01); *H04N 5/23277* (2013.01); *H04N 5/23293* (2013.01); *H04N 5/265* (2013.01)

(58) Field of Classification Search
CPC .. H04N 5/2355; H04N 5/265; H04N 5/23216; H04N 5/2625; H04N 5/2356; G06T 3/4053; G06T 7/579; G06T 2207/10144; G06T 2207/20221; G06L 9/36; G06K 9/46
USPC ...... 348/222.1, 333.11, 333.01, 333.09, 246, 348/247, 208.13, 231.99, 14.6; 382/148, 382/299, 209, 220, 167, 307, 191, 284
See application file for complete search history.

(56) References Cited

U.S. PATENT DOCUMENTS

| | | | | |
|---|---|---|---|---|
| 2002/0181762 A1* | 12/2002 | Silber | ...................... | G06K 9/00 382/256 |
| 2005/0129324 A1* | 6/2005 | Lemke | .................. | H04N 1/387 382/254 |
| 2005/0232512 A1* | 10/2005 | Luk | ...................... | G06K 9/6293 382/190 |
| 2007/0031063 A1* | 2/2007 | Zhou | ...................... | G06K 9/36 382/284 |
| 2008/0136942 A1 | 6/2008 | Yoon et al. | | |
| 2009/0232213 A1 | 9/2009 | Jia | | |
| 2012/0069141 A1* | 3/2012 | Sim | ...................... | H04N 5/2355 348/36 |
| 2012/0274814 A1* | 11/2012 | Wajs | ...................... | G06K 9/36 345/639 |
| 2013/0236094 A1 | 9/2013 | Albu et al. | | |
| 2014/0313400 A1 | 10/2014 | Kaizu et al. | | |
| 2014/0363087 A1 | 12/2014 | Tico et al. | | |
| 2015/0043811 A1 | 2/2015 | Prabhudesai et al. | | |
| 2015/0062410 A1 | 3/2015 | Kim et al. | | |
| 2015/0086117 A1* | 3/2015 | Comstock, II | ....... | G06K 9/4666 382/191 |
| 2015/0237264 A1 | 8/2015 | Amitay et al. | | |
| 2016/0037067 A1 | 2/2016 | Lee et al. | | |
| 2016/0330374 A1* | 11/2016 | Ilic | ...................... | H04N 5/23267 348/208.1 |
| 2017/0034429 A1* | 2/2017 | Huysegems | ....... | H04N 5/23216 348/208.99 |
| 2018/0173401 A1* | 6/2018 | Kim | ...................... | G06F 3/0481 455/566 |
| 2019/0174056 A1* | 6/2019 | Jung | .................. | H04N 5/23222 348/207.1 |
| 2019/0182434 A1* | 6/2019 | Moon | .................. | H04N 5/2625 348/231.99 |

FOREIGN PATENT DOCUMENTS

KR 1020160016068 2/2016
WO WO 2010/132025 11/2010

OTHER PUBLICATIONS

PCT/ISA/237 Written Opinion issued on PCT/KR2017/002210 (pp. 7).
European Search Report dated Feb. 20, 2019 issued in counterpart application No. 17775673.1-1208, 6 pages.

* cited by examiner

ELECTRONIC DEVICE AND METHOD FOR PROCESSING IMAGE

PRIORITY

This application is a National Phase Entry of PCT International Application No. PCT/KR2017/002210, which was filed on Feb. 28, 2017, and claims priority to Korean Patent Application No. 10-2016-0038585, which was filed on Mar. 30, 2016, the contents of which are incorporated herein by reference.

BACKGROUND

1. Field

Various embodiments of the present disclosure relate generally to generating an improved image through various processing processes using a plurality of images.

2. Description of the Related Art

In general, a Super Resolution (SR) image is an image which has the maximum resolution and definition that a single image can have, and may be generated by a combination of consecutive low-resolution images obtained during an interval between a time at which a particular still image is generated and a time at which the next still image is generated. Such an SR image may be used for a technique for restoring images of an astronomical telescope and criminal images, as well as used for an alternate technique for the digital zoom of a normal camera.

SUMMARY

An image processing solution such as super resolution or High Dynamic Range (HDR) accompanies various processing solutions for several images of the same scene, such that the total processing time may become longer, which may influence the time required to generate a fusion image.

Accordingly, it is possible to secure the time for some of the processing required for generating the fusion image based on the interval between the time at which a still image is generated and the time at which a next still image is generated.

Various embodiments of the present disclosure provide an electronic device and a method for processing an image.

According to various embodiments of the present disclosure, the method of an electronic device is provided. The method includes: acquiring a plurality of images, including a first image and a second image, corresponding to an external object through an image sensor; providing at least some of the plurality of images, which are processed through the image sensor, as preview images; detecting image information based on at least the preview images; storing images including at least the first image and the second image among the plurality of images in a buffer; and generating a third image by image fusion of an image set including at least the first image and the second image among the images stored in the buffer based on the image information in response to an input related to photographing.

According to various embodiments of the present disclosure, an electronic device is provided. The electronic device includes: an image sensor; a buffer configured to buffer an image acquired from the image sensor; and a processor, wherein the processor is configured to acquire a plurality of images, including a first image and a second image, corresponding to an external object through the image sensor, provide at least some of the plurality of images, which are processed through the image sensor, as preview images, detect image information based on at least the preview images, store at least the first image and the second image of the plurality of images in the buffer, and generate a third image through image fusion of an image set including at least the first image and the second image based on the image information in response to a received input related to photographing.

Since the image information used for generating an improved image is detected in advance and stored, in various embodiments of the present disclosure, the processing time can be reduced from a point in time at which the event for generating the improved image occurs.

In various embodiments of the present disclosure, the precision of registration and image fusion performed for generating an improved image can be improved the processing time of the improved image can be reduced, and the image quality level can be improved.

DETAILED DESCRIPTION

Figure 1:
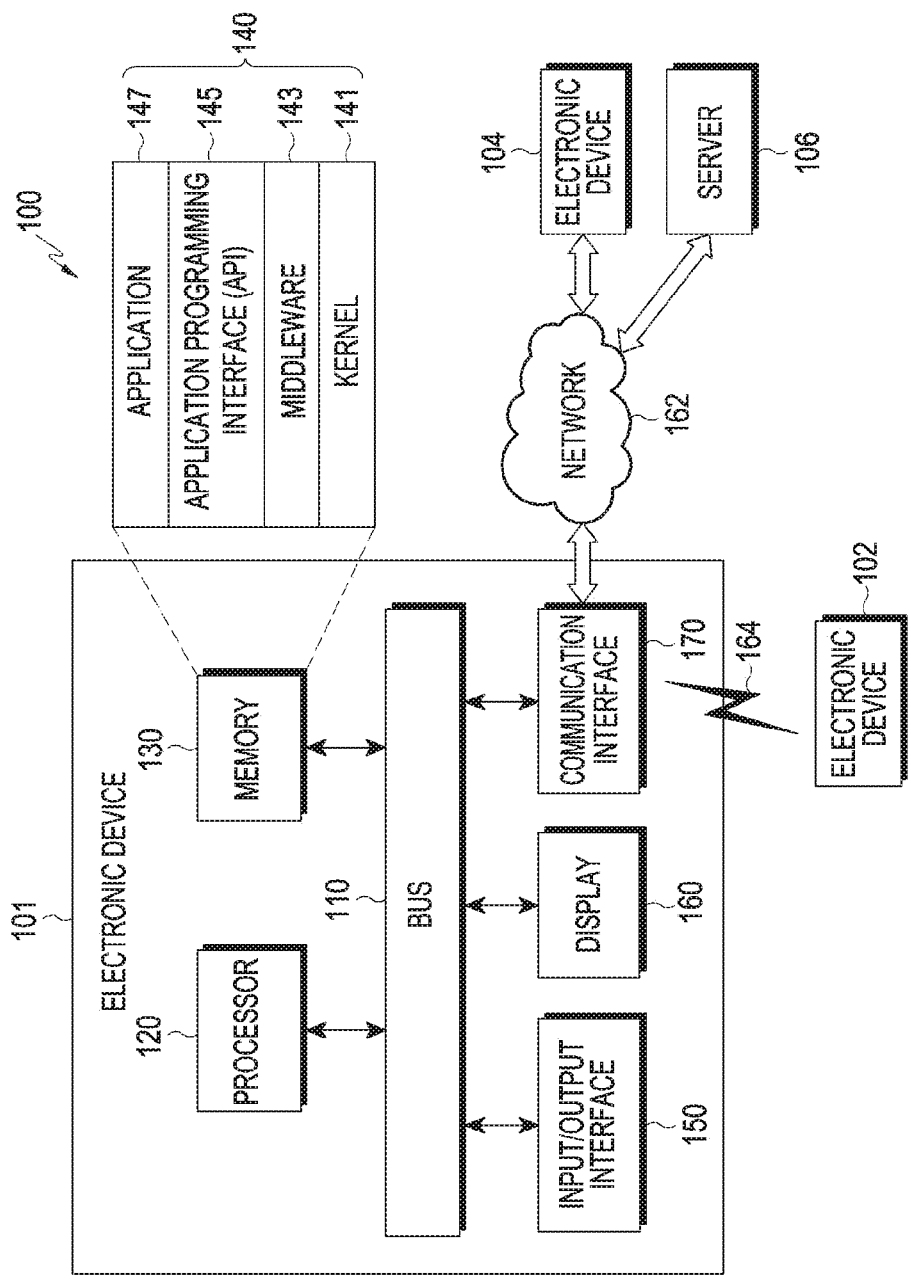
FIG. 1 illustrates a network environment including an electronic device, according to various embodiments.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. In the present disclosure, the expression "A or B", "at least one of A and/or B", or "A/B" may include all possible combinations of the items listed. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment of the present disclosure is not limited to the above described devices. In the present disclosure, the term "user" may indicate a person using an electronic device or a device (e.g., an artificial intelligence electronic device) using an electronic device.

An electronic device 101 in a network environment 100 according to various embodiments will be described with reference to FIG. 1. The electronic device 101 may include a bus 110, a processor 120, a memory 130, an input/output interface 150, a display 160, and a communication interface 170. In some embodiments, the electronic device 101 may omit at least one of the elements, or may further include other elements.

The bus 110 may include, for example, a circuit that interconnects the elements 110 to 170 and transmits communication (for example, control messages or data) between the elements.

The processor 120 may include one or more of a central processing unit, an application processor, and a communication processor (CP). The processor 120, for example, may carry out operations or data processing relating to the control and/or communication of at least one other element of the electronic device 101.

The memory 130 may include volatile and/or non-volatile memory. The memory 130 may store, for example, instructions or data relevant to at least one other element of the electronic device 101.

According to an embodiment, the memory 130 may store software and/or a program 140. The program 140 may include a kernel 141, middleware 143, an Application Programming Interface (API) 145, and/or application programs (or "applications") 147. At least some of the kernel 141, the middleware 143, and the API 145 may be referred to as an operating system.

The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data. Furthermore, the middleware 143 may process one or more task requests, which are received from the application programs 147, according to priorities thereof. For example, the middleware 143 may assign priorities for using the system resources (for example, the bus 110, the processor 120, the memory 130, or the like) of the electronic device 101 to one or more of the application programs 147, and may process the one or more task requests. The API 145 is an interface through which the applications 147 control functions provided from the kernel 141 or the middleware 143, and may include, for example, at least one interface or function (for example, instruction) for file control, window control, image processing, or text control. For example, the input/output interface 150 may forward instructions or data, input from a user or an external device, to the other element(s) of the electronic device 101, or may output instructions or data, received from the other element(s) of the electronic device 101, to the user or the external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160 may display, for example, various types of content (for example, text, images, videos, icons, and/or symbols) for a user. The display 160 may include a touch screen and may receive, for example, a touch, gesture, proximity, or hovering input using an electronic pen or the user's body part.

The communication interface 170 may establish, for example, communication between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may include, for example, a cellular communication that uses at least one of LTE, LTE-Advance (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication may include, for example, at least one of Wi-Fi (Wireless Fidelity), Bluetooth, Bluetooth low energy (BLE), ZigBee, near field communication (NFC), magnetic secure transmission, Radio Frequency (RF), and body area network (BAN). According to an embodiment, the wireless communication may include GNSS. The GNSS may be, for example, a global positioning system (GPS), a global navigation satellite system (Glonass), a Beidou navigation satellite system (hereinafter, referred to as "Beidou"), or Galileo (the European global satellite-based navigation system). Hereinafter, in this document, the term "GPS" may be interchangeable with the term "GNSS". The wired communication may include, for example, at least one of a Universal Serial Bus (USB), a High Definition Multimedia Interface (HDMI), Recommended Standard 232 (RS-232), power line communication, a Plain Old Telephone Service (POTS), and the like. The network 162 may include a telecommunications network, for example, at least one of a computer network (for example, a LAN or a WAN), the Internet, and a telephone network.

Each of the first and second external electronic devices 102 and 104 may be of the same or a different type from the electronic device 101.

According to various embodiments, all or some of the operations performed in the electronic device 101 may be performed in another electronic device or a plurality of electronic devices (for example, the electronic devices 102 and 104, or the server 106).

According to an embodiment, when the electronic device 101 has to perform a function or service automatically or in response to a request, the electronic device 101 may request another device (for example, the electronic device 102 or 104, or the server 106) to perform at least some functions relating thereto, instead of autonomously or additionally performing the function or service. Another electronic device (for example, the electronic device 102 or 104, or the server 106) may execute the requested functions or the additional functions, and may deliver a result thereof to the electronic device 101. The electronic device 101 may provide the received result as it is, or may additionally process the received result to provide the requested functions or services. To this end, for example, cloud computing, distributed computing, or client-server computing technology may be used.

Figure 2:
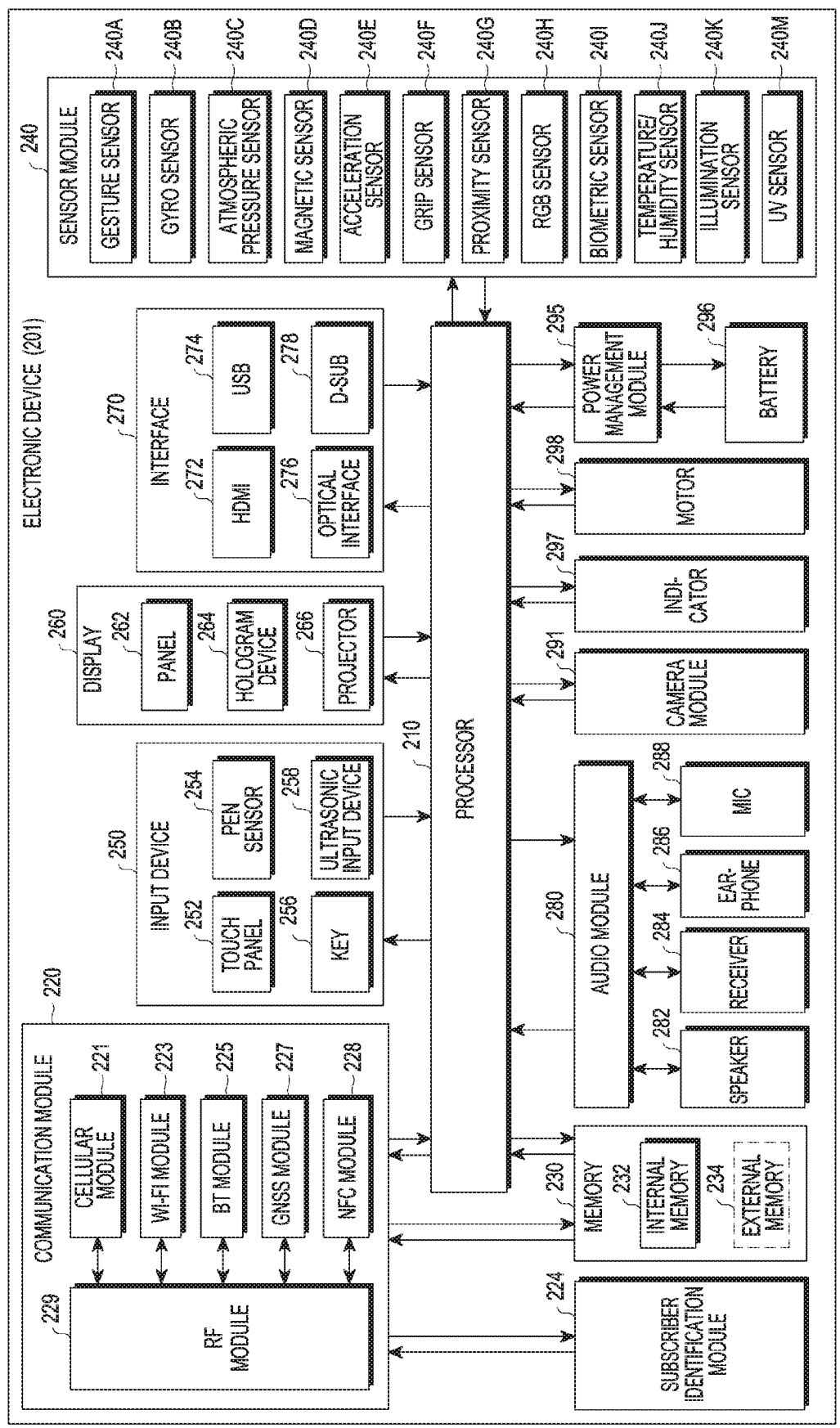
FIG. 2 is a block diagram of an electronic device according to various embodiments.

FIG. 2 is a block diagram illustrating an electronic device 201 according to various embodiments. The electronic device 201 may include, for example, the whole or part of the electronic device 101 illustrated in FIG. 1. The electronic device 201 may include at least one processor 210 (for example, an AP), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected thereto and may perform various data processing and operations by driving an operating system or an application program. The processor 210 may be implemented by, for example, a System on Chip (SoC).

According to an embodiment, the processor 210 may further include a graphic processing unit (GPU) and/or an image signal processor. The processor 210 may also include at least some of the elements illustrated in FIG. 2 (for example, a cellular module 221). The processor 210 may load, in volatile memory, instructions or data received from at least one of the other elements (for example, non-volatile memory), process the loaded instructions or data, and store the resultant data in the non-volatile memory.

According to an embodiment, the processor 260 may detect image information (for example, feature information and blur information) to generate an improved image (for example, an SR image, an HDR image, or a low luminance image) based on a preview image generated by the camera module 291 and store the detected image information in the memory 230 (or buffer). According to an embodiment, the processor 260 may detect at least one piece (or some pieces) of feature information including at least one (or some) of an object within the image, a reference axis, and edge information and blur image indicating a blurredness level of the image.

According to an embodiment, when an input related to photographing is received, the processor 260 may generate a fusion image by image fusion of images stored in the memory 230 (or buffer) based on detected image information.

According to an embodiment, the processor 210 may select a reference image from among a plurality of images stored in the memory 230 (or buffer) based on image information and produce registration information of each of other images except for the reference image. The registration information may include a difference value of feature information such as an object location, a reference axis (for example, x axis or y axis), an edge location, an amount of exposure, brightness, or a combination thereof between the reference image and the other images.

According to an embodiment, the processor 210 may register the reference image and each of other images based on the produced registration information. The processor 210 may correct the object location, the reference axis, and the edge location of other images to be the same as those of the reference image based on the registration information. For example, the processor 210 may arrange other images such that areas corresponding to partial areas of each of the other images overlap at the same location based on at least partial areas of the reference image.

According to an embodiment, the processor 210 may generate a fusion image by image fusion of the registered reference image and other images and post-process the generated composite image to improve image quality, so as to generate an SR image.

The communication module 220 may have a configuration that is the same as, or similar to, that of the communication interface 170. The communication module 220 (for example, the communication interface 170) may include, for example, a cellular module 221, a Wi-Fi module 223, a Bluetooth module 225, a GNSS module 227, an NFC module 228, and an RF module 229. The cellular module 221 may provide, for example, a voice call, a video call, a text message service, an Internet service, or the like through a communication network. According to an embodiment of the present disclosure, the cellular module 221 may identify or authenticate an electronic device 201 in the communication network using a subscriber identification module (for example, a Subscriber Identity Module (SIM) card) 224. According to an embodiment, the cellular module 221 may perform at least some of the functions that the AP 210 may provide. According to an embodiment, the cellular module 221 may include a communication processor (CP). In some embodiments, at least some (two or more) of the cellular module 221, the Wi-Fi module 223, the Bluetooth module 225, the GNSS module 227, and the NFC module 228 may be included in a single Integrated Chip (IC) or IC package. The RF module 229 may transmit/receive, for example, a communication signal (for example, an RF signal). The RF module 229 may include, for example, a transceiver, a power amp module (PAM), a frequency filter, a low noise amplifier (LNA), an antenna, or the like. According to another embodiment, at least one of the cellular module 221, the Wi-Fi module 223, the BT module 225, the GNSS module 227, and the NFC module 228 may transmit/receive an RF signal through a separate RF module. The subscriber identification module 224 may include, for example, a card that includes a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include, for example, at least one of a volatile memory (for example, a DRAM, an SRAM, an SDRAM, or the like) and a non-volatile memory (for example, a One Time Programmable ROM (OTPROM), a PROM, an EPROM, an EEPROM, a mask ROM, a flash ROM, a flash memory, a hard disc drive, or a Solid State Drive (SSD)). The external memory 234 may include a flash drive, for example, a compact flash (CF), a secure digital (SD), a Micro-SD, a Mini-SD, an eXtreme digital (xD), a multi-media card (MMC), a memory stick, and the like. The external memory 234 may be functionally and/or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, and a ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210 in order to control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user. The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) to identify data corresponding to the detected ultrasonic waves.

The display 260 (for example, the display 160) may include a panel 262, a hologram device 264, a projector 266, and/or a control circuit for controlling them. The panel 262 may be implemented to be, for example, flexible, transparent, or wearable. The panel 262, together with the touch panel 252, may be configured as one or more modules. According to an embodiment, the panel 262 may include a pressure sensor (or a POS sensor) which may measure a strength of pressure of a user's touch. The pressure sensor may be implemented so as to be integrated with the touch panel 252 or may be implemented as one or more sensors separate from the touch panel 252. The hologram device 264 may show a three dimensional image in the air by using an interference of light. The projector 266 may display an image by projecting light onto a screen. The screen may be located, for example, in the interior of, or on the exterior of, the electronic device 201. The interface 270 may include, for example, an HDMI 272, a USB 274, an optical interface 276, or a D-subminiature (D-sub) 278. The interface 270 may be included in, for example, the communication circuit 170 illustrated in FIG. 1. Additionally or alternatively, the interface 270 may, for example, include a mobile high-definition link (MHL) interface, a secure digital (SD) card/multi-media card (MMC) interface, or an infrared data association (IrDA) standard interface.

The audio module 280 may convert, for example, sound into an electrical signal, and vice versa. At least some elements of the audio module 280 may be included, for example, in the input/output interface 145 illustrated in FIG. 1. The audio module 280 may process sound information that is input or output through, for example, a speaker 282, a receiver 284, earphones 286, the microphone 288, and the like.

The camera module 291 is a device that can photograph a still image and a moving image. According to an embodiment, the camera module 291 may include one or more image sensors (for example, a front sensor or a rear sensor), a lens, an image signal processor (ISP), or a flash (for example, an LED or xenon lamp).

According to an embodiment, the camera module 291 may process at least some of a plurality of photographed images and provide the same through the display 260 as preview images. According to an embodiment, an image signal processor of the camera module 291 may pre-process a plurality of images successively output from one or more image sensors. The image signal processor may store at least some of the pre-processed images in the memory 230 (or buffer) or post-process the same and may display the stored or post-processed images through the display 260 as preview images.

According to various embodiments, processing of the photographed images may be performed by the image signal processor of the camera module 280, or the processor 210 may process at least some of a plurality of photographed images and provide the processed images through the display 260 as preview images.

The power management module 295 may manage, for example, the power of the electronic device 201. According to an embodiment, the power management module 295 may include a power management integrated circuit (PMIC), a charger IC, or a battery or fuel gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the residual amount of the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (for example, the processor 210) of the electronic device 201. The motor 298 may convert an electrical signal into a mechanical vibration and may generate a vibration, a haptic effect, or the like. The electronic device 201 may include a mobile TV support device that can process media data according to a standard, such as digital multimedia broadcasting (DMB), digital video broadcasting (DVB), mediaFlo™, and the like. Each of the above-described component elements of hardware according to the present disclosure may be configured with one or more components, and the names of the corresponding component elements may vary based on the type of electronic device. According to various embodiments, the electronic device (for example, the electronic device 201) may not include some elements, or may further include additional elements. Some elements may be coupled to constitute one object, but the electronic device may perform the same functions as those of the corresponding elements before being coupled to each other.

Figure 3:
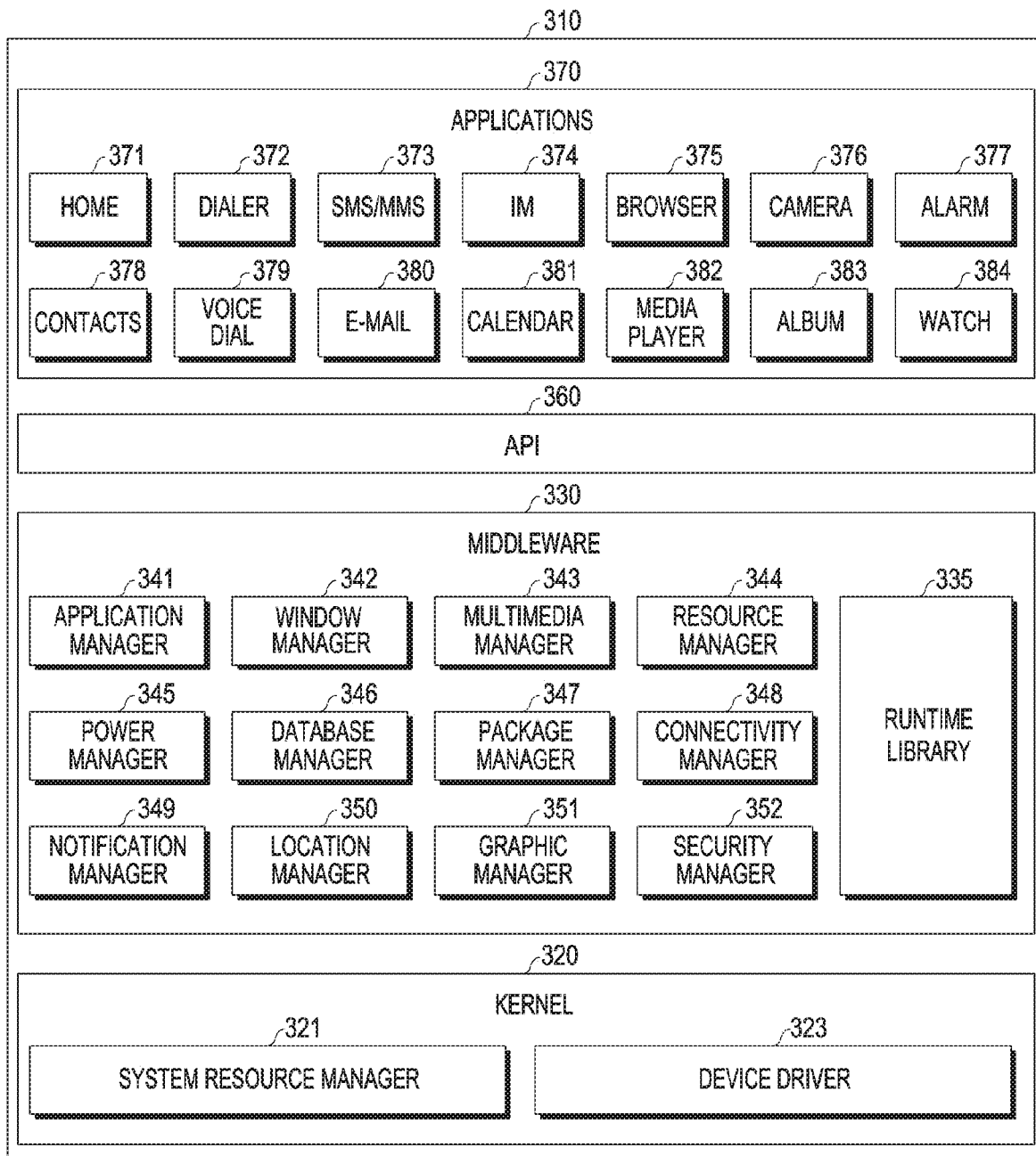
FIG. 3 is a block diagram of a program module according to various embodiments.

FIG. 3 is a block diagram of a program module according to various embodiments. According to an embodiment, the program module 310 (for example, the program 140) may include an Operating System (OS) that controls resources relating to an electronic device (for example, the electronic device 101) and/or various applications (for example, the application programs 147) that are driven on the operating system. The operating system may include, for example, Android™, iOS™, Windows™, Symbian™, Tizen™, or Bada™. Referring to FIG. 3, the program module 310 may include a kernel 320 (for example, the kernel 141), middleware 330 (for example, the middleware 143), an API 360 (for example, the API 145), and/or applications 370 (for example, the application programs 147). At least a part of the program module 310 may be preloaded on the electronic device, or may be downloaded from an external electronic device (for example, the electronic device 102 or 104 or the server 106).

The kernel 320 may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver. The middleware 330 may provide, for example, a function required by the applications 370 in common, or may provide various functions to the applications 370 through the API 360 such that the applications 370 can efficiently use limited system resources within the electronic device. According to an embodiment, the middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may manage an input/output, manage a memory, or process an arithmetic function. The application manager 341 may manage, for example, the life cycles of the applications 370. The window manager 342 may manage GUI resources used for a screen. The multimedia manager 343 may identify formats required for reproducing various media files and may encode or decode a media file using a codec suitable for the corresponding format. The resource manager 344 may manage the source code of the applications 370 or the space in memory. The power manager 345 may manage, for example, the capacity or power of a battery and may provide power information required for operating the electronic device. According to an embodiment, the power manager 345 may operate in conjunction with a Basic Input/Output System (BIOS). The database manager 346 may, for example, generate, search, or change databases to be used by the applications 370. The package manager 347 may manage the installation or update of an application that is distributed in the form of a package file.

The connectivity manager 348 may manage, for example, a wireless connection. The notification manager 349 may provide information on an event (for example, an arrival message, an appointment, a proximity notification, or the like) to a user. The location manager 350 may manage, for example, the location information of the electronic device. The graphic manager 351 may manage a graphic effect to be provided to a user and a user interface relating to the graphic effect. The security manager 352 may provide, for example, system security or user authentication. According to an embodiment, the middleware 330 may include a telephony manager for managing a voice or video call function of the electronic device or a middleware module that is capable of forming a combination of the functions of the above-described elements. According to an embodiment, the middleware 330 may provide an operating-system-specific module. Furthermore, the middleware 330 may dynamically remove some of the existing elements, or may add new elements. The API 360 is, for example, a set of API programming functions, and may be provided with different configurations depending on the operating system. For example, with respect to each platform, one API set may be provided in the case of Android or iOS, and two or more API sets may be provided in the case of Tizen.

The applications 370 may include, for example, a home application 371, a dialer application 372, an SMS/MMS application 373, an instant messaging (IM) application 374, a browser application 375, a camera application 376, an alarm application 377, a contact application 378, a voice dial application 379, an email application 380, a calendar application 381, a media player application 382, an album application 383, a watch application 384, a health-care application (for example, for measuring exercise quantity or blood glucose), or an application providing environmental information (for example, atmospheric pressure, humidity, or temperature information). According to an embodiment, the applications 370 may include an information exchange application that can support the exchange of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device to provide the received notification information to a user. The device management application may perform a function (for example, a function of turning on/off an external electronic device (or some elements thereof) or controlling brightness (or resolution) of the display) of the external electronic device communicating with the electronic device or install, delete, or update an application executed by the external electronic device. According to an embodiment, the applications 370 may include applications (for example, a health care application of a mobile medical appliance) that are designated according to the attributes of an external electronic device. According to an embodiment, the applications 370 may include applications received from an external electronic device. At least some of the program module 310 may be implemented (for example, executed) by software, firmware, hardware (for example, the processor 210), or a combination of two or more thereof and may include a module, a program, a routine, an instruction set, or a process for performing one or more functions.

Figure 4:
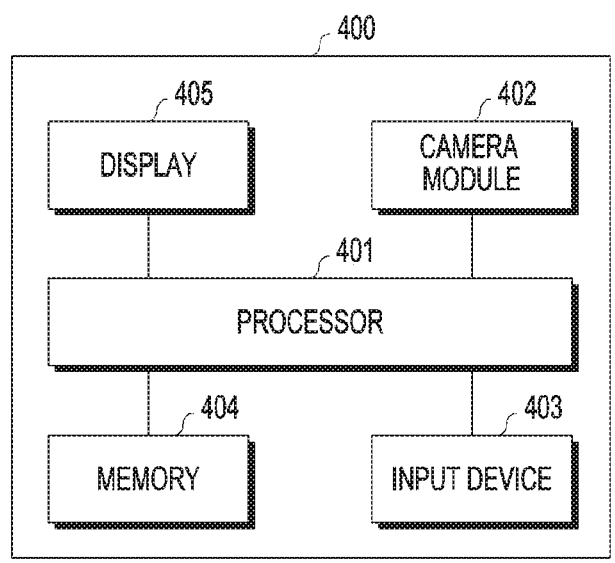
FIG. 4 is a block diagram of an electronic device according to various embodiments.

FIG. 4 is a block diagram illustrating an electronic device according to various embodiments.

Referring to FIG. 4, an electronic device 400 may include a processor 401, a camera module 402, an input device 403, memory 440, and a display 405.

The processor 401 may control the overall operation of the electronic device 400 and, particularly, control the operation of the camera module 402, the input device 403, the memory 404, and the display 405.

According to an embodiment, the camera module 402 (for example, the image signal processor) may photograph a plurality of images and pre-process the plurality of photographed images. The camera module 402 (for example, the image signal processor) may store at least some of the pre-processed images in a buffer (for example, a first buffer), post-process at least some of the pre-processed images, and display some of the post-processed images through the display 405 as preview images.

According to various embodiments, the processor 401 may acquire a plurality of images through the camera module 402. For example, the processor 401 may pre-process a plurality of images successively output from an image sensor included in the camera module 402. At least some of the pre-processed images may be stored in the buffer (for example, the first buffer).

The processor 401 may process some of the plurality of acquired images and display the processed images through the display 405 as preview images. For example, the processor 401 may post-process some of the plurality of pre-processed images and display the post-processed images through the display 405 as preview images.

According to an embodiment, the processor 401 may detect image information for generating an SR image based on the preview images and store the detected image information in a buffer (for example, a second buffer). The image information may include feature information which includes an object location within the image, a reference axis (x, y, and z axes), edge information (for example, an edge location), the amount of exposure, brightness, or a combination thereof, and blur information (for example, a blur value) indicating a blurredness level of the image (for example, a shaking level attributable to the motion of the electronic device 400).

According to an embodiment, when an input related to photographing is received through the input device 403, the processor 401 may performing image fusion of a plurality of images (for example, a plurality of images stored in the first buffer) based on image information (image information stored in the second buffer). The input related to photographing may be an input for generating an improved image, and the input for generating the improved image may include a case in which zoom in/out is controlled, a case in which an object such as a finger is detected in a predetermined area of the display 405 after the zoom in/out is controlled, and a case in which a hovering or touch input is detected on a picture-taking button.

For example, when a photographing mode that corresponds to the input related to photographing is an SR mode, the processor 401 may generate an image of which the resolution is changed by image fusion of a plurality of images based on image information.

For example, when a photographing mode that corresponds to the input related to photographing is an HDR mode, the processor 401 may generate an image of which brightness is changed by image fusion of a plurality of images based on image information.

According to an embodiment, the processor 401 may select a reference image from among a plurality of images based on image information and may produce registration information of respective other images based on the selected reference image. The reference image may be an image having the lowest blurredness level among the plurality of images based on blur information of the image information. In other words, the reference image may be an image having the highest definition level among the plurality of images.

The processor 401 may identify, from the buffer, feature information such as the object location of each image other than the reference image, the reference axis, the edge location, the amount of exposure, brightness, or a combination thereof and the compare feature information of the reference image and the identified feature information of each of the other images, so as to produce registration information including a difference value between the feature information.

The processor 401 may register the reference image and each of the other images based on the produced registration information and may perform image fusion the registered reference image and other images to generate a fusion image. For example, the processor 401 may correct the object location of each of the other images based on the difference value such that the object location of each of the other images equally overlaps the object location of the reference image.

According to an embodiment, the processor 401 may generate an SR image by post-processing the generated fusion image.

According to various embodiments, the processor 401 may detect the image information for generating the SR image based on preview images, may select the reference image based on the detected image information, may produce registration information of each image other than the reference image, and may store the produced registration information in the buffer. When an input related to photographing is received through the input device 403, the processor 401 may register the reference image and the other images based on the produced registration information and may image fusion of the registered reference image and the registered images to generate a fusion image.

The camera module 402 may include a lens for allowing light to pass therethrough, an image sensor for receiving light, and a circuit for converting a signal of light into a digital signal in order to photograph a still or moving image. According to an embodiment, the camera module 402 (for example, the image signal processor) may pre-process at least some of the photographed images and store at least some of the pre-processed images in the buffer (for example, the first buffer). The camera module 402 (for example, the image signal processor) may post-process at least some of the pre-processed images and provide the post-processed images through the display 405 as preview images.

The input device 403 may receive an input for photographing and an input for generating an improved image.

The memory 404 may store all pieces of information used when the electronic device 400 generates the improved image. For example, the memory 404 may store image information.

The display 405 may display the preview images or the improved image.

According to various embodiments, a method of an electronic device may include: an operation of acquiring a plurality of images including a first image and a second image corresponding to an external object through an image sensor; an operation of providing at least some of the plurality of images, which are processed through the image sensor, as preview images; an operation of detecting image information at least based on the preview images; an operation of storing images including at least the first image and the second image among the plurality of images in a buffer; and an operation of generating a third image by image fusion of an image set including at least the first image and the second image among the images stored in the buffer based on the image information in response to an input related to photographing.

Figure 5:
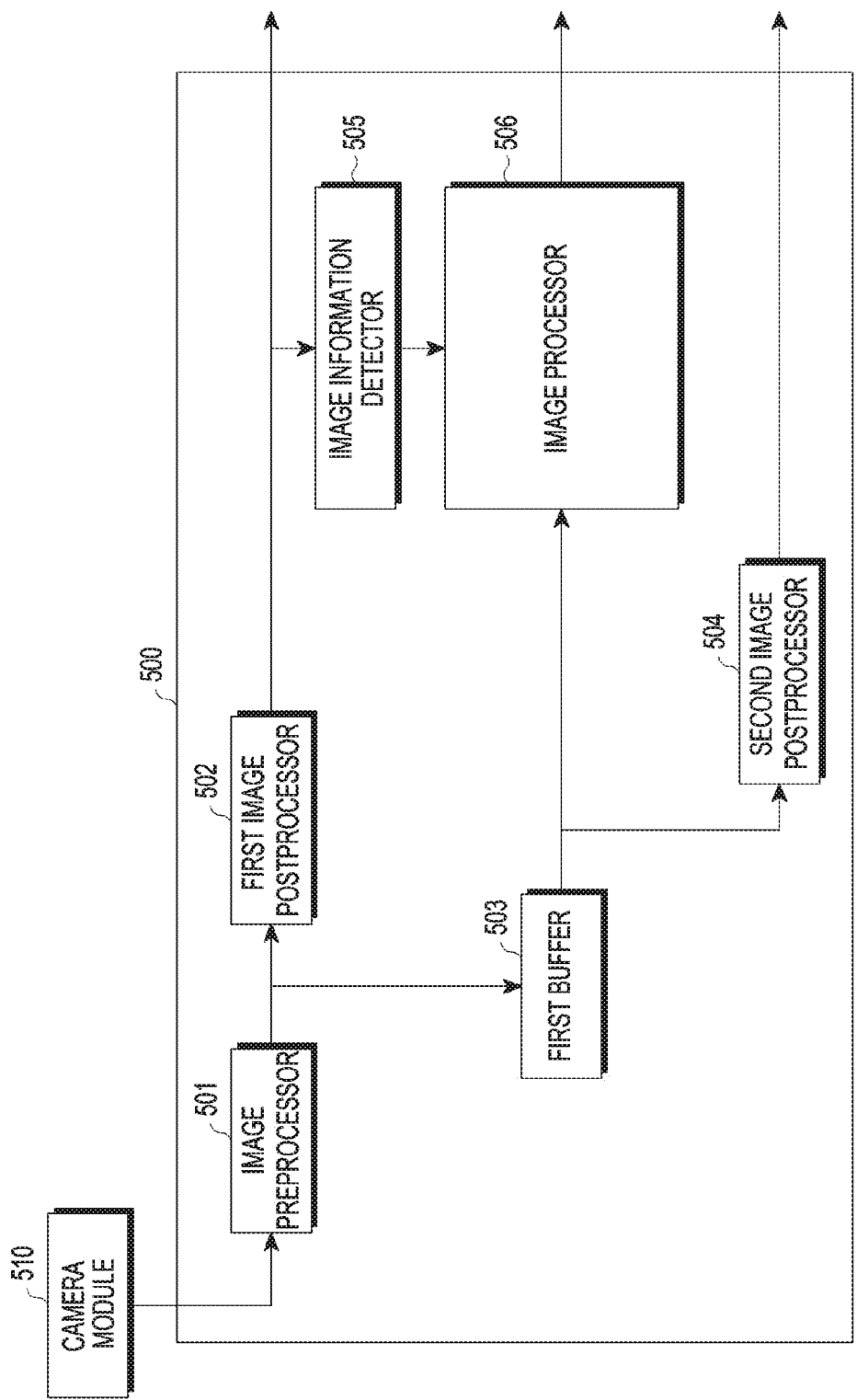
FIG. 5 is a block diagram of a processor according to various embodiments.

FIG. 5 is a block diagram illustrating a processor according to various embodiments.

Referring to FIG. 5, the processor 500 may include an image preprocessor 510, a first postprocessor 502, a first buffer 503, a second image postprocessor 504, an image information detector 505, and an image processor 506.

According to an embodiment, the image preprocessor 501 may correct an image input by the camera module 510 through an image processing algorithm through which the camera module 510 corrects optical defects and defects made during manufacturing.

According to an embodiment, the first image postprocessor 502 may generate preview images by post-processing the images pre-processed by the image preprocessor 501 through an image processing algorithm for processing the input image to be high-quality color images.

According to various embodiments, the image preprocessor 501 and the first image postprocessor 502 may be included in the processor 500 or may be included in the camera module 402 of FIG. 4. In this case, the image signal processor of the camera module 402 may pre-process a plurality of images through the image preprocessor 501 and post-process the pre-processed images through the first image postprocessor 502.

According to an embodiment, in order to reduce (or remove) the difference between the time at which the preview image is generated and the still image is generated, the first buffer 503 may store images (for example, two to five images), which have been output from the camera module 510 and pre-processed through the image preprocessor 501. The images stored in the first buffer 501 may include images at the same point in time as the generated preview images. For example, the images input through the camera module 505 may be pre-processed through the image preprocessor 501, the pre-processed images may be post-processed through the first image postprocessor 502 and provided as preview images, and the same pre-processed images may be stored in the first buffer 503.

According to an embodiment, when an input (for example, an input for generating a still image) related to photographing is received, the second image postprocessor 504 may generate a still image by processing the image at the same point in time as the preview images at the point in time of the input among images stored in the first buffer 503 through an image processing algorithm for improving image quality. The generated still image may be stored in the memory (for example, the memory 404).

According to an embodiment, the image information detector 505 may detect image information including feature information such as the object location within the preview image, the reference axis, and edge information and blur information indicating a blurredness level. For example, the image information detector 505 may detect image information in the preview image generated through the first image postprocessor 502. The extracted image information may be stored in the memory (for example, the buffer). The memory may be provided inside or outside the image information detector 505.

According to an embodiment, when an input for generating an improved image is received, the image processor 506 may select a reference image from among a plurality of images stored in the first buffer 503 based on image information detected by the image information detector 505 (or stored in the buffer) at a point in time of the input and produce registration information of images other than the reference image. For example, the image processor 506 may identify blur information of the plurality of images stored in the first buffer 503 and select, as the reference image, an image having the lowest blur value from among the plurality of images. The image processor 506 may produce registration information corresponding to a difference value by comparing feature information of the reference image and feature information of each image other than the reference image.

The image processor 506 may register the reference image and each of the other images based on the produced registration information and may perform image fusion of the registered reference image and each of the registered images to generate a fusion image. For example, the image processor 506 may correct a location of an object for each of the other images to match (or correspond to) the location of the object of the reference image based on the calculated difference value, may correct a reference axis of each of the other images to match (or correspond to) the reference axis of the reference image, or may correct an edge location of each of the other images to match (or correspond to) the edge location of the reference image. The image processor 506 may generate a composite image by image fusion of the reference image and the corrected other images and post-process the generated fusion image to improve image quality thereof to generate an improved image (for example, an SR image, an HDR image, or a low-luminance image).

Figure 6:
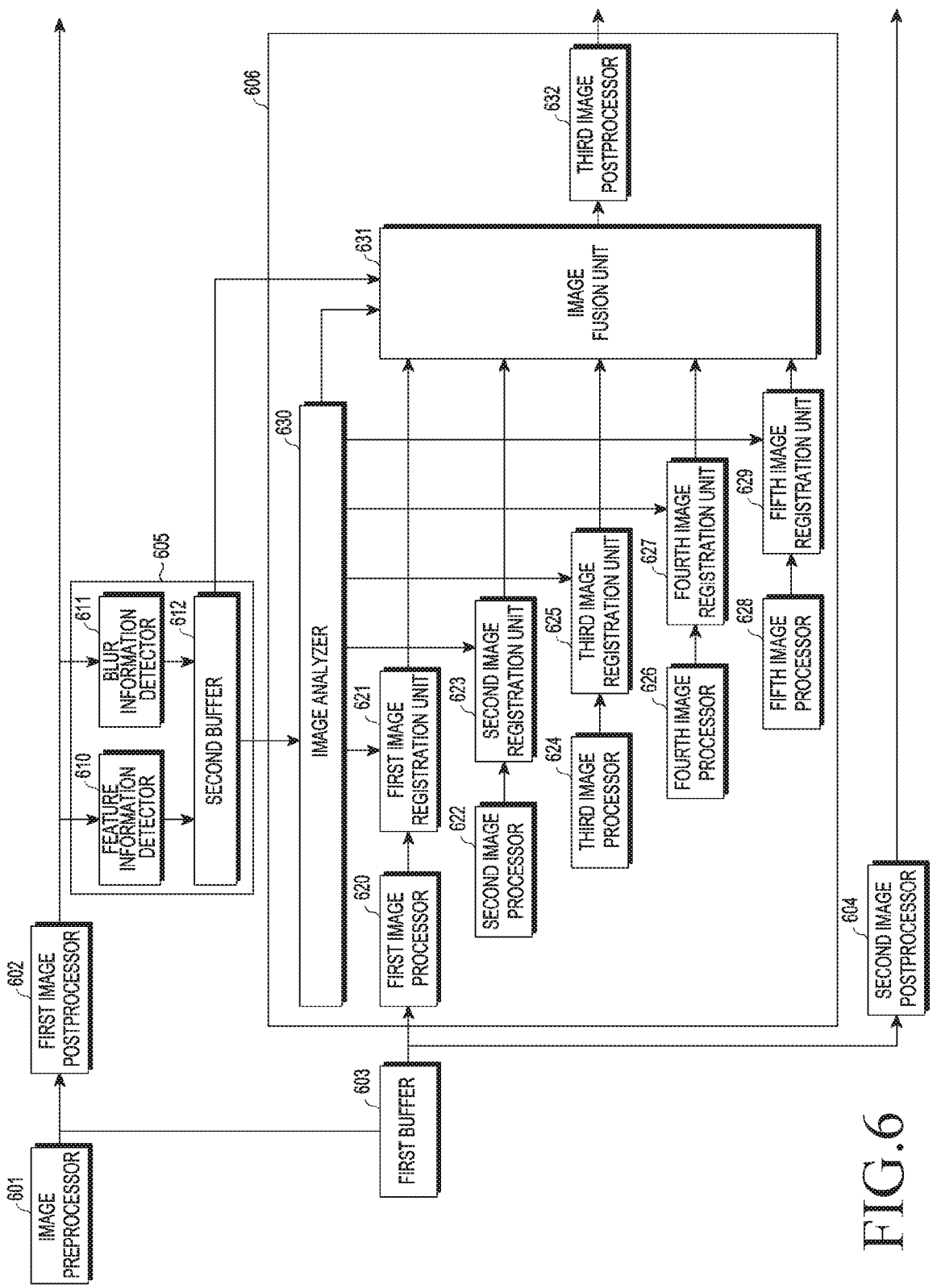
FIG. 6 is a block diagram of a processor according to various embodiments.

FIG. 6 is a block diagram illustrating a processor according to various embodiments.

Referring to FIG. 6, the processor 600 may include an image preprocessor 601, a first postprocessor 602, a first buffer 603, a second image postprocessor 603, an image information detector 604, and an image processor 606. The image information detector 605 may include an image feature extractor 610, a blur information detector 611, and a second buffer 612. The image processor 606 may include a first image processor 620, a first image registration unit 621, a second image processor 622, a second image registration unit 623, a third image processor 624, a third image registration unit 625, a fourth image processor 626, a fourth image registration unit 627, a fifth image processor 628, a fifth image registration unit 629, an image analyzer 630, an image fusion unit 631, and a third image postprocessor 632.

FIG. 6 illustrates an example of a method using five images stored in the first buffer 603 to generate one improved image. However, the number of images used for generating the improved image in the present disclosure is not limited to a particular number. For example, the electronic device 400 may store three images or seven images in the first buffer 603 and generate an improved image (for example, an SR image, an HDR image, or a low-luminance image) based on the stored images. According to an embodiment, the image preprocessor 601 and the first image postprocessor 602 may operate in the same way as that of the image preprocessor 501 and the first image postprocessor 502 described in FIG. 4.

According to an embodiment, the first buffer 603 may store some of the images output from the image preprocessor 601. For example, the first buffer 603 may store five images.

According to an embodiment, the second image postprocessor 604 may operate in the same way as that of the second image postprocessor 504 described in FIG. 4.

According to an embodiment, the feature information detector 610 may detect feature information such as the object location, the reference axis, and edge information from the preview image. When the second buffer 612 stores image information of five images, the feature information detector 610 may detect feature information of each of the five images from the preview images and store the detected feature information in the second buffer 612.

According to an embodiment, the blur information detector 611 may detect blur information (for example, a blur value) indicating a blurredness level from the preview images. When the second buffer 612 stores image information of the five images, the blur information detector 611 may detect blur information of each of the five images from the preview images and store the detected blur information in the second buffer 612.

In FIG. 6, the image information detector 605 includes both the feature information detector 610 and the blur information detector 611. According to various embodiments, the image information detector 605 may include at least one (or some) of the feature information detector 610 and the blur information detector 611.

According to an embodiment, the second buffer 612 may store the detected feature information and blur information. For example, the second buffer 612 may store the feature information and the blur information of the five images and, when a predetermined time passes, may delete feature information and blur information of n images and store feature information and blur information of n images detected next. Here, n may be a natural number between 1 and 5.

In this case, the feature information detector 610 may detect feature information of each of the five images from the preview images, may store the detected feature information in the second buffer 612, may detect feature information of each of n images corresponding to the number of images deleted from the second buffer 612, and may store the detected feature information in the second buffer 612.

Further, the blur information detector 611 may detect blur information of each of the five images from the preview images, may store the detected blur information in the second buffer 612, may detect blur information of each of n images corresponding to the number of images deleted from the second buffer 603, and may store the detected blur information in the second buffer 612.

According to an embodiment, when an input of generating an improved image is received, the image analyzer 630 may select a reference image from among the images stored in the first buffer 603 based on the blur information stored in the second buffer 612. For example, the image analyzer 630 may select, as the reference image, an image having the smallest blur value from among the five images stored in the first buffer 603 at the input point in time. The reference image may be an image having the highest image quality.

The second buffer 612 may store image information detected from the preview images. For example, the second buffer 612 may be included in the memory 130 of FIG. 1 or the memory 230 of FIG. 2. Further, although the second buffer 612 is illustrated as a "buffer" in drawings, the method of storing the detected image information is not limited to a specific data structure in the present disclosure. For example, the image information detected from the preview images may be stored while being included in a data structure (for example, a structure such as a list or an array) in which each preview image is managed.

According to an embodiment, the image analyzer 630 may compare feature information of the reference image and feature information of other images except for the reference image in order to produce registration information of each of the other images. For example, the image analyzer 630 may compare the object location of the reference image and an object location of each of the other images to produce registration information corresponding to a difference value between the object locations.

According to an embodiment, the image analyzer 630 may control some of the first image processor 620, the second image processor 622, the third image processor 624, the fourth image processor 626, and the fifth image processor 628 to perform image processing for the improvement of image quality of the other images except for the reference image.

According to an embodiment, the image analyzer 630 may control some of the first image registration unit 621, the second image registration unit 623, the third image registration unit 625, the fourth image registration unit 627, and the fifth image registration unit 629 to perform registration for the reference image and each of the other images based on registration information of each of the other images for which image processing has been performed.

For example, when a third image is selected as the reference image from among a first image, a second image, the third image, a fourth image, and a fifth image, the first image processor 620 may perform image processing for the first image and the first image registration unit 621 may correct the first image to match the reference image based on registration information of the first image.

The second image processor 622 may perform image processing for the second image and the second image registration unit 623 may correct the second image to match the reference image based on registration information of the second image.

The fourth image processor 626 may perform image processing for the fourth image and the fourth image registration unit 627 may correct the fourth image to match the reference image based on registration information of the fourth image.

The fifth image processor 628 may perform image processing for the fifth image and the fifth image registration unit 629 may correct the fifth image to match the reference image based on registration information of the fifth image.

According to an embodiment, the image fusion unit 631 may generate a fusion image by image fusion of the registered reference image and other images.

According to an embodiment, the third image postprocessor 632 may finally generate an improved image (for example, an SR image, an HDR image, or a low-luminance image) by performing image processing to improve image quality of the composite image.

Figure 7:
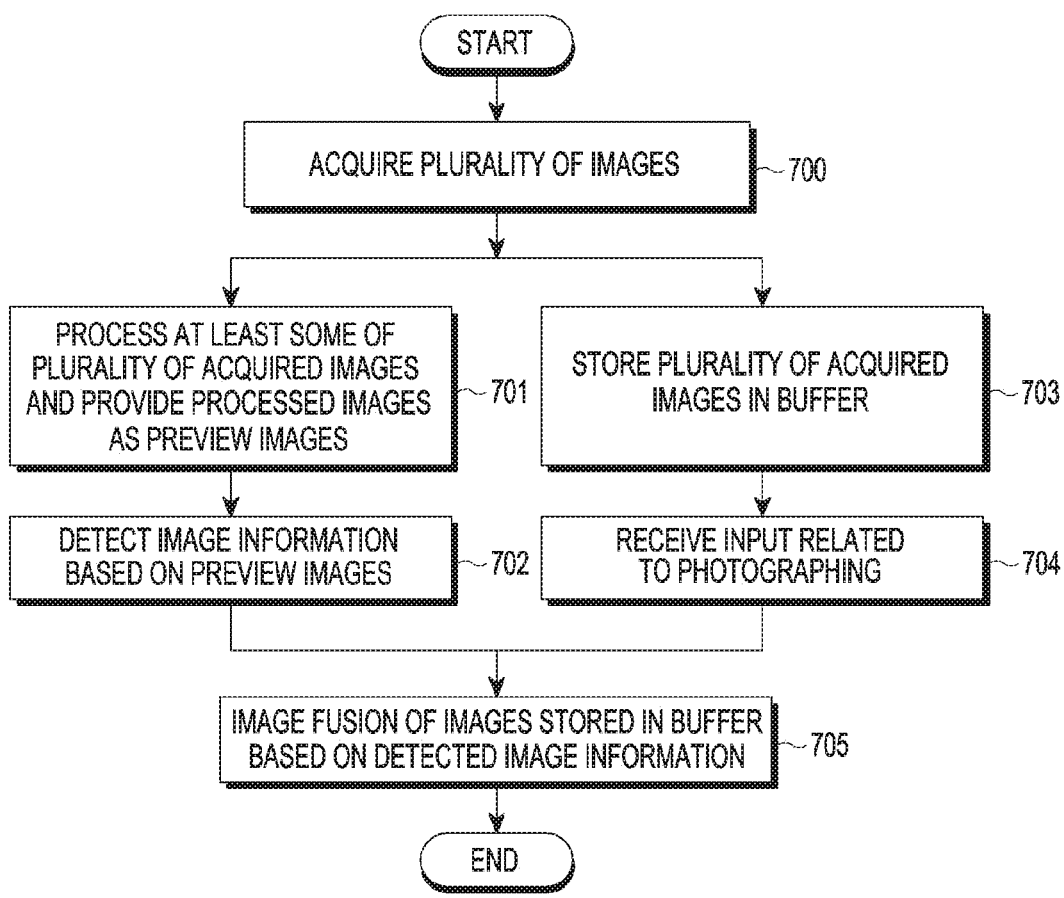
FIG. 7 is a flowchart illustrating an operation of generating an improved image by an electronic device according to various embodiments.

FIG. 7 is a flowchart illustrating an operation of generating an improved image by an electronic device according to various embodiments. According to various embodiments, operation 700 to operation 705 may be executed through the electronic device 101, 104, 201, or 400, the server 106, the processor 120, 210, 401, 500, or 600, the camera module 280 or 402, and the program module 310.

Referring to FIG. 7, the electronic device 400 (for example, the processor 401) may acquire a plurality of images in operation 700. For example, the electronic device 400 (for example, the processor 401) may receive a plurality of images photographed through the camera module 280 or 402.

In operation 701, the electronic device 400 (for example, the processor 401) may process at least some of the plurality of acquired images and provide the processed images as preview images. For example, the electronic device 400 (for example, the processor 401) may perform pre-processing for at least some of the plurality of images in order to improve image quality thereof, may perform post-processing the pre-processed images, and may display the post-processed images through the display 405 as preview images.

According to various embodiments, the operation of photographing a plurality of images, processing at least some of the photographed images, and providing the processed images as preview images may be performed through the camera module 280 or 402.

In operation 702, the electronic device 400 (for example, the processor 401) may detect image information based on preview images. For example, the electronic device 400 (for example, the processor 401) may detect feature information such as the object location, the reference axis, and edge information in the preview images, detect blur information indicating a blurredness level of the image, and store the detected feature information and blur information in the buffer.

In operation 703, the electronic device 400 (for example, the processor 401) may store the plurality of acquired images in the buffer. Here, the buffer may store pre-processed images (for example, two to five images) at the same point in time as the preview images.

According to various embodiments, the operation of photographing a plurality of images, processing at least some of the photographed images, and storing the processed images in the buffer may be performed through the camera module 280 or 402.

In operation 704, the electronic device 400 (for example, the processor 401) may receive an input related to photographing. For example, the input related to photographing may be an input for controlling the zoom of a camera lens.

According to various embodiments, operation 701 to operation 702 and operation 703 to operation 704 may be performed in parallel.

In operation 705, the electronic device 400 (for example, the processor 401) may perform image fusion of the images stored in the buffer based on detected image information. For example, the electronic device 400 (for example, the processor 401) may select a reference image from among the images stored in the buffer based on blur information and produce registration information of other images except for the reference image based on feature information. The electronic device 400 (for example, the processor 401) may perform registration for the reference image and other images based on the produced registration information and perform image fusion of the registered reference image and other images to generate a composite image.

According to an embodiment, an electronic device may include: an image sensor; a buffer configured to buffer an image acquired from the image sensor; and a processor, wherein the processor may acquire a plurality of images including a first image and a second image corresponding to an external object through the image sensor, may provide at least some of the plurality of images, which are processed through the image sensor, as preview images, may detect image information at least based on the preview images, may store at least the first image and the second image of the plurality of images in the buffer, and may generate a third image through image fusion of an image set including at least the first image and the second image based on the image information in response to a received input related to photographing.

Figure 8:
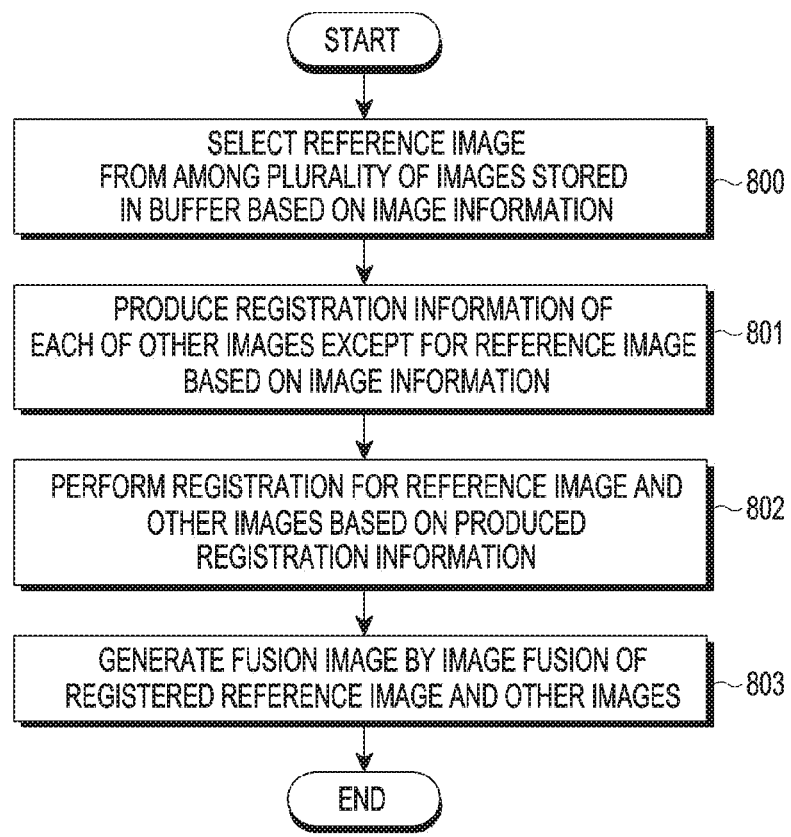
FIG. 8 is a flowchart illustrating an operation of generating a fusion image when an input for generating an improved image is received by an electronic device according to various embodiments.

FIG. 8 is a flowchart illustrating an operation of generating a fusion image when an input for generating an improved image is received by an electronic device according to various embodiments. According to various embodiments, operation 800 to operation 803 may be executed through the electronic device 101, 104, 201, or 400, the server 106, the processor 120, 210, 401, 500, or 600, the camera module 280 or 402, and the program module 310.

Referring to FIG. 8, the electronic device 400 (for example, the processor 401) may select a reference image from among a plurality of images stored in the buffer based on image information in operation 800. For example, the electronic device 400 (for example, the processor 401) may select the reference image from among the plurality of images stored in the buffer based on blur information of the image information detected in advance from the preview images. The selected reference image may be the clearest image.

In operation 801, the electronic device 400 (for example, the processor 401) may produce registration information of each of other images except for the reference image based on the image information. For example, the electronic device 400 (for example, the processor 401) may produce registration information of other images except for the reference image based on feature information of the image information detected in advance from the preview images. The registration information may include a difference value between the feature information of the reference image and feature information of each of the other images.

In operation 802, the electronic device 400 (for example, the processor 401) may perform registration for the reference image and the other images based on the produced registration information. For example, the electronic device 400 (for example, the processor 401) may correct each of the other images to match the reference image based on the registration information of each of the other images.

In operation 803, the electronic device 400 (for example, the processor 401) may generate a fusion image by image fusion of the registered reference image and other images. For example, the electronic device 400 (for example, the processor 401) may perform image fusion of the reference image and the other images and post-process the fusion image to improve image quality thereof in order to generate an improved image (for example, an SR image, an HDR image, or a low-luminance image). The generated image may be stored in the memory 130, 230, or 404.

Figure 9:
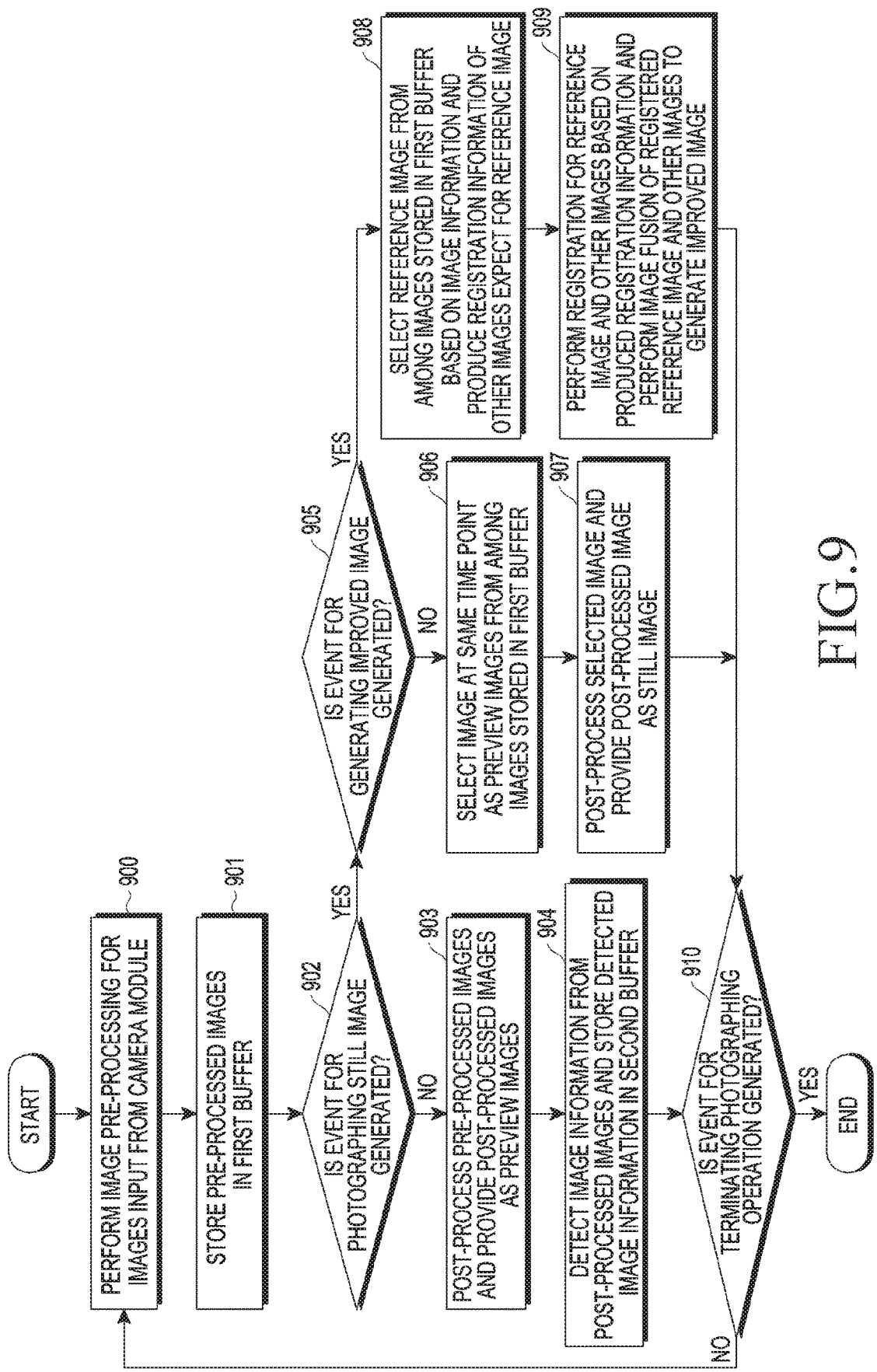
FIG. 9 is a flowchart illustrating an operation of photographing an image by an electronic device according to various embodiments.

FIG. 9 is a flowchart illustrating an operation of photographing an image by an electronic device according to various embodiments. According to various embodiments, operation 900 to operation 910 may be executed through the electronic device 101, 104, 201, or 400, the server 106, the processor 120, 210, 401, 500, or 600, the camera module 280 or 402, and the program module 310.

Referring to FIG. 9, the processor 600 may perform image pre-processing for images input from the camera module 280 or 402 in operation 900.

In operation 901, the processor 600 may store the pre-processed images in the first buffer 603. The first buffer 603 may store five images.

According to various embodiments, the operation of photographing a plurality of images, pre-processing at least some of the photographed images, and storing the pre-processed images in the first buffer may be performed through the camera module 208 or 402.

The processor 600 may determine whether an event for photographing a still image is generated in operation 902. The processor 600 may perform operation 905 when the event for photographing a still image is generated, and perform operation 903 when the event for photographing a still image is not generated.

In operation 903, the processor 600 may post-process the pre-processed images and provide the post-processed images as preview images. According to various embodiments, the operation of post-processing the pre-processed images and providing the post-processed images as preview images may be performed through the camera module 208 or 402.

In operation 904, the processor 600 may detect image information from the post-processed images and store the detected image information in the second buffer 612. For example, the processor 600 may detect feature information including the object location within the image, the reference axis, and edge information and blur information indicating a blurredness level of the image and store the detected feature information and blur information in the second buffer 612.

The processor 600 may determine whether an event for generating an improved image is generated in operation 905. The processor 600 may perform operation 908 when the event for generating the improved image is generated, and perform operation 906 when the event for generating the improved image is not generated.

In operation 906, the processor 600 may select the image at the same point in time as the preview images among images stored in the first buffer 603. For example, when an event for generating a still image is generated, the processor 600 may select the image at the same time point as the preview images at the time point at which the event is generated.

In operation 907, the processor 600 may post-process the selected image and provide the post-processed image as the still image. For example, the processor 600 may generate the still image by performing image post-processing for the selected image to improve image quality thereof.

In operation 908, the processor 600 may select a reference image from among the images stored in the first buffer 603 based on image information stored in the second buffer 612 and produce registration information of other images except for the reference image. For example, the processor 600 may select, as the reference image, an image having the lowest blur value from among the images stored in the first buffer 600 based on the blur information. The processor 600 may produce registration information corresponding to a difference value by comparing feature information of the reference image and feature information of each of the other images.

In operation 909, the processor 600 may perform registration of the reference image and the other images based on the produced registration information and compose the registered reference image and other images in order to generate an improved image. For example, the processor 600 may correct each of the other images to match the reference image based on registration information of each of the other images. The processor 600 may arrange the reference image and the other images such that partial areas of the reference image match areas of each of the other images corresponding to the partial areas of the reference image.

The processor 600 may generate a fusion image by image fusion of the reference image and the corrected other images. The processor 600 may generate an improved image (for example, an SR image, an HDR image, or a low-luminance image) by post-processing the fusion image to improve image quality thereof.

The processor 600 may determine whether an event for terminating the photographing operation is generated in operation 910. The processor 600 may terminate the operation when the event for terminating the photographing operation is generated, and perform operation 901 to operation 909 when the event for terminating the photographing operation is not generated.

Since the image information used for generating the improved image is detected in advance and stored in various embodiments of the present disclosure, the processing time may be reduced from a point in time at which the event for generating the improved image occurs.

According to various embodiments of the present disclosure, it is possible to increase the precision of registration and image fusion performed for generating an improved image, reduce the processing time of the improved image, and improve an image quality level.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the present disclosure may include one or more of the aforementioned elements or may further include other additional elements, or some of the aforementioned elements may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

The invention claimed is:

1. A method comprising:
   obtaining a plurality of images comprising an external object through an image sensor;
   providing preview images based on the plurality of images;
   identifying image information including first image information of a reference image from among the preview images and second image information corresponding to images except the reference image from among the previous images, at least based on the preview images; and
   generating an image by performing image fusion of an image set including at least one image among the plurality of images based on a difference between the first image information and the second image information, in response to an input related to photographing,
   wherein the image information and the second image information comprise at least one of locations of the external object within the preview images, a reference axis, edge information, the amount of exposure, brightness, or blur information, for a respective image.

2. The method of claim 1, wherein generating the image comprises performing registration between images included in the image set based on the image information.

3. The method of claim 2, wherein performing the registration comprises:
   determining at least one image of the image set as a reference image based on the image information; and
   arranging the image set based on at least partial areas of the reference image such that areas corresponding to the partial areas of the image included in the image set overlap at an identical location.

4. The method of claim 3, wherein performing the registration comprises determining at least one image of the image set as the reference image based on a blurredness level.

5. The method of claim 1, wherein generating the image comprises generating the image of which a resolution is changed by performing image fusion of the first image and the second image based on a Super Resolution (SR) mode, which is a photographing mode corresponding to the input related to photographing.

6. The method of claim 1, wherein generating the image comprises generating the image of which brightness is changed by performing image fusion of the first image and the second image based on a High Dynamic range (HDR) mode which is a photographing mode corresponding to the input related to photographing.

7. An electronic device comprising:
   an image sensor;
   a buffer configured to buffer an image acquired from the image sensor; and
   a processor,
   wherein the processor is configured to:
   obtain a plurality of images comprising an external object through the image sensor,
   provide preview images based on the plurality of images,
   identify image information including first image information of a reference image from among the preview images and second image information corresponding to images except the reference image from among the preview images, at least based on the preview images, and
   generate an image through image fusion of an image set including at least one image among the plurality of images based on a difference between the first image information and the second image information, in response to a received input related to photographing,
   wherein the first image information and second comprise at least one of locations of the external object within the preview images, a reference axis, edge information, the amount of exposure, brightness, or blur information, for a respective image.

8. The electronic device of claim 7, wherein the processor is configured to perform registration between images included in the image set based on the image information.

9. The electronic device of claim 7, wherein the processor is configured to determine at least one image of the image set as a reference image based on the image information and arrange the image set based on at least partial areas of the reference image such that areas corresponding to the partial areas of the image included in the image set overlap at an identical location.

10. The electronic device of claim 9, wherein the processor is configured to determine at least one image of the image set as the reference image based on a blurredness level.

11. The electronic device of claim 7, wherein the processor is configured to generate the image of which a resolution is changed by performing image fusion of the first image and the second image based on a Super Resolution (SR) mode which is a photographing mode corresponding to the input related to photographing.

12. The electronic device of claim 7, wherein the processor is configured to generate the image of which brightness is changed by performing image fusion of the first image and the second image based on a High Dynamic Range (HDR) mode which is a photographing mode corresponding to the input related to photographing.

13. A non-transitory storage medium storing instructions configured to cause at least one processor to perform at least one operation when executed by the at least one processor, the at least one operation comprising:

obtaining a plurality of images comprising an external object through an image sensor;

providing preview images based on the plurality of images;

identifying image information including first image information of a reference image from among the preview images and second image information corresponding to images except the reference image from among the preview images, at least based on the preview images; and generating an image through image fusion of an image set including at least one image among the plurality of images based on a difference between the first image information and the second image information, in response to a received input related to photographing, wherein the first image information and the second image information comprise at least one of locations of the external object within the preview images, a reference axis, edge information, the amount of exposure, brightness, or blur information, for a respective image.

* * * * *